(12) United States Patent
Brigham (10) Patent No.: US 11,473,718 B2
(45) Date of Patent: Oct. 18, 2022

(54) PIPE INSULATION SYSTEM

(71) Applicant: Graham Brigham, Sherwood Park (CA)

(72) Inventor: Graham Brigham, Sherwood Park (CA)

(73) Assignee: Integrity Products & Supplies Inc., Sherwood Park (CA)

( * ) Notice: Subject to any disclaimer, the term of this patent is extended or adjusted under 35 U.S.C. 154(b) by 324 days.

(21) Appl. No.: 16/802,863

(22) Filed: Feb. 27, 2020

(65) Prior Publication Data

US 2021/0172561 A1 Jun. 10, 2021

(30) Foreign Application Priority Data

Dec. 10, 2019 (CA) .............................. CA 3064458

(51) Int. Cl.
*F16L 59/12* (2006.01)
*F16L 59/02* (2006.01)
*F24F 13/08* (2006.01)

(52) U.S. Cl.
CPC ........... *F16L 59/123* (2013.01); *F16L 59/022* (2013.01); *F24F 13/08* (2013.01)

(58) Field of Classification Search
CPC ........ F16L 59/12; F16L 59/123; F16L 59/022
USPC .................. 138/112–114, 148, 149
See application file for complete search history.

(56) References Cited

U.S. PATENT DOCUMENTS

| 3,575,445 | A | | 4/1971 | French |
| 5,971,029 | A | * | 10/1999 | Smith ................. F16L 55/1656 264/269 |
| 5,996,643 | A | * | 12/1999 | Stonitsch .............. F16L 59/143 138/143 |
| 7,278,469 | B2 | | 10/2007 | Sasaki et al. |
| 9,422,718 | B2 | | 8/2016 | Ehsani |
| 9,958,105 | B1 | | 5/2018 | Dye et al. |

FOREIGN PATENT DOCUMENTS

| CN | 104100209 B | 8/2016 |
| WO | 9102143 A1 | 2/1991 |
| WO | 2014086332 A1 | 6/2014 |
| WO | 2016093716 A1 | 6/2016 |

* cited by examiner

*Primary Examiner* — Patrick F Brinson
(74) *Attorney, Agent, or Firm* — Finch & Maloney PLLC (57) ABSTRACT

A pipe insulation system has a spacer wrap, an insulation material and a cladding. The spacer wrap has an upper surface and a lower surface. The upper surface of the spacer wrap has a plurality of convex protrusions. The upper surface is positioned against a pipe. The insulation material has an inner surface and an outer surface. The insulation material is positioned exterior to the lower surface of the spacer wrap. The cladding has an interior surface and an exterior surface. The cladding is positioned exterior to the outer surface of the insulation material.

25 Claims, 10 Drawing Sheets

PIPE INSULATION SYSTEM

FIELD OF THE DISCLOSURE

The present application relates generally to a pipe insulation system.

BACKGROUND

This section provides background information to facilitate a better understanding of the various aspects of the invention. It should be understood that the statements in this section of this document are to be read in this light, and not as admissions of prior art.

When in operation, pipelines are exposed to moisture as a result of moisture intrusion from surroundings (rain, snow, chemical fumes, etc.) or sweating from dew point condensation. This moisture can have a negative impact on the material used to insulate the pipes and can also result in premature corrosion of the pipes. As a result, the insulation may have to be replaced more frequently to improve the insulation quality and pipes may have to be replaced more frequently as they corrode.

BRIEF SUMMARY

There is provided a pipe insulation system that has a spacer wrap, an insulation material and cladding. The spacer wrap has an upper surface and a lower surface. The upper surface of the spacer wrap has a plurality of convex protrusions. The upper surface is positioned against a pipe. The insulation material is positioned exterior to the lower surface of the spacer wrap. The cladding has an interior surface and an exterior surface. The cladding is positioned exterior to the insulation.

In one embodiment, the spacer wrap is made of polytetrafluoroethylene. This material can withstand both high and low temperatures.

In one embodiment, the spacer wrap is held in place around the pipe with banding.

In one embodiment, the lower surface of the spacer wrap has concave depressions corresponding to the convex protrusions.

In one embodiment, a perforated dimple wrap is provided. The perforated dimple wrap has an upper surface and a lower surface. The perforated dimple wrap has a plurality of dimples such that the upper surface has convex protrusions and the lower surface has concave depressions that correspond to the convex protrusions. At least a portion of the convex protrusions have a perforation through which moisture may drain. The perforated dimple wrap is positioned exterior to the insulation material and interior to the cladding.

In one embodiment, the plurality of dimples have a hollow body. The hollow body has a top, a bottom and at least one inward sloping peripheral side. The top of the hollow body is attached to the upper surface of the perforated dimple wrap. The bottom has the perforation. The plurality of dimples may also have a wall that extends beyond the bottom of the hollow body. The wall has at least one slit through which moisture may drain.

There is also provided a pipe insulation system that has an insulation material, a perforated dimple wrap and a cladding. The insulation material has an inner surface and an outer surface. The perforated dimple wrap has an upper surface and a lower surface. A plurality of dimples are provided on the perforated dimple wrap such that the upper surface has convex protrusions and the lower surface has concave depressions that correspond to the convex protrusions. At least a portion of the convex protrusion have a perforation through which moisture may drain. The perforated dimple wrap is positioned around the outer surface of the insulation material. The cladding has an interior surface and an exterior surface. The cladding is positioned adjacent the upper surface of the perforated dimple wrap.

In one embodiment, the plurality of dimples have a hollow body. The hollow body has a top, a bottom and at least one inward sloping peripheral side. The top of the hollow body is attached to the upper surface of the perforated dimple wrap. The bottom has the perforation. The plurality of dimples may also have a wall that extends beyond the bottom of the hollow body. The wall has at least one slit through which moisture may drain.

In one embodiment, at least one vent is positioned in the cladding to allow air to pass through the vent and create airflow within the cladding. To reduce water ingress, the vents may have louvers.

In one embodiment, at least one drain is positioned on a bottom of the cladding to create at least one drainage point for fluid within the cladding and insulation.

In one embodiment, a spacer wrap has an upper surface and a lower surface. The upper surface of the spacer wrap has a plurality of convex protrusions. The lower surface is positioned against the inner surface of the insulation material. The lower surface may have concave depressions corresponding to the convex protrusions.

There is also provided a method of insulation a piping system. Insulation material with a top surface and a bottom surface is provided. The bottom surface is positioned adjacent a pipe. Cladding having an interior surface and an exterior surface is provided. The cladding is positioned exterior to the outer surface of the insulation material. At least one drain is provided to create at least one drainage point for fluid within the cladding. The at least one drain is positioned on a bottom of the cladding.

In one embodiment, a spacer wrap is provided. The spacer wrap has an upper surface and a lower surface. The upper surface of the spacer wrap has a plurality of convex protrusions. The lower surface is positioned interior to the insulation material. The lower surface may have concave depressions corresponding to the convex protrusions.

In one embodiment, a perforated dimple wrap is provided. The perforated dimple wrap has an upper surface and a lower surface. The perforated dimple wrap has a plurality of dimples such that the upper surface has convex protrusions and the lower surface has concave depressions corresponding to the convex protrusions. At least a portion of the convex protrusions have a perforation through which moisture may drain. The perforated dimple wrap is positioned around the outer surface of the insulation material and interior to the cladding.

In one embodiment, at least one vent is positioned on the cladding such that air may pass through the vent to create airflow within the cladding. The vents may have louvers to reduce water ingress.

BRIEF DESCRIPTION OF THE DRAWINGS

These and other features will become more apparent from the following description in which references are made to the following drawings, in which numerical references denote like parts. The drawings are for the purpose of illustration only and are not intended to in any way limit the scope of the invention to the particular embodiments shown.

DETAILED DESCRIPTION OF THE PREFERRED EMBODIMENTS

A pipe insulation system, generally identified by reference numeral 10, will now be described with reference to FIG. 1 through FIG. 23.

Figure 1:
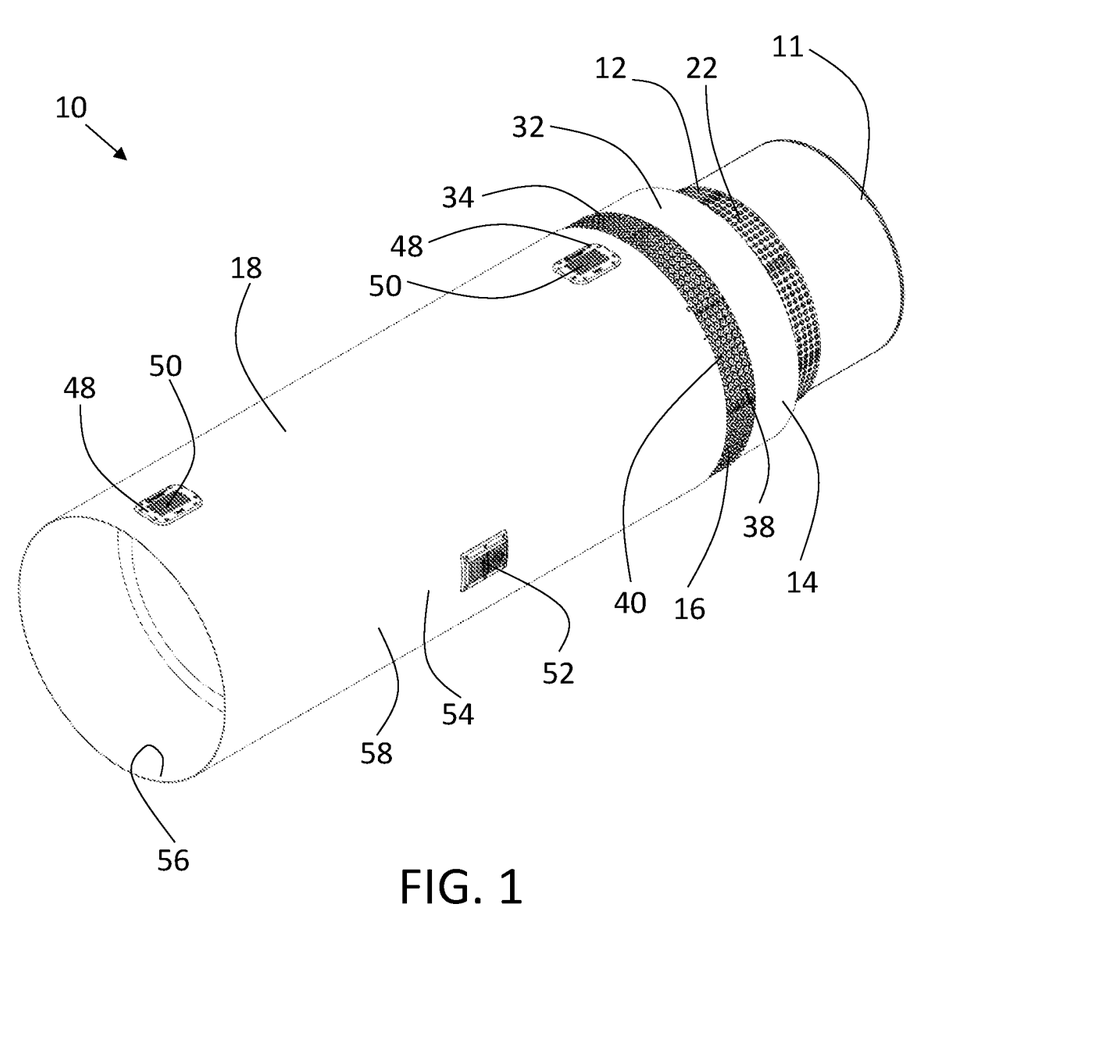
FIG. 1 is a perspective view of a pipe insulation system.
Figure 3:
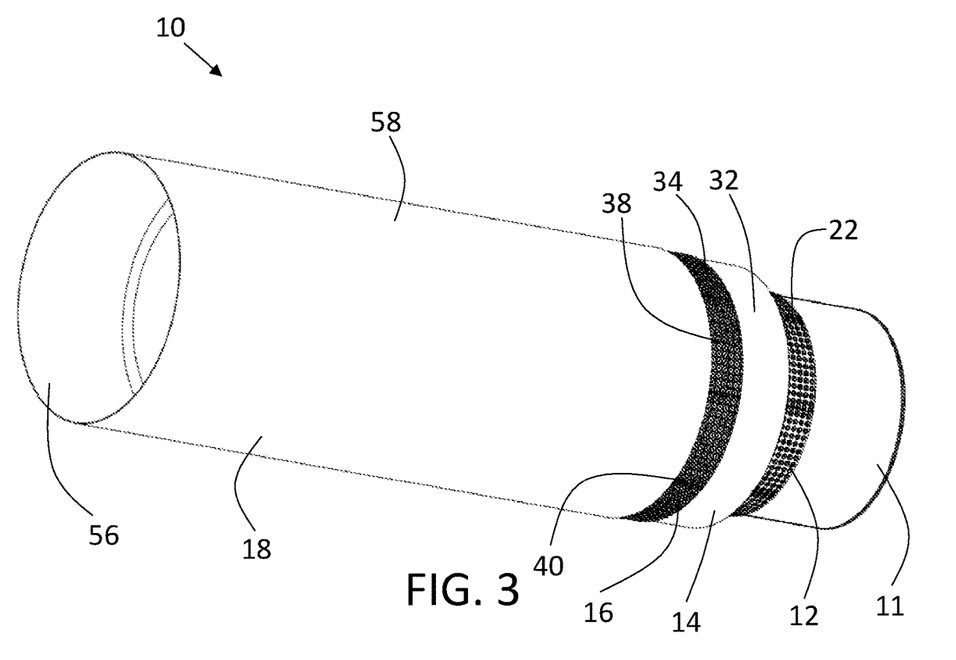
FIG. 3 is a perspective view of a variation of the pipe insulation system.

Spacer Wrap and Perforated Dimple Wrap:

Referring to FIG. 1, in the embodiment shown, pipe insulation system 10 has a spacer wrap 12, insulation material 14, a perforated dimple wrap 16 and cladding 18. Spacer wrap 12 has an upper surface 20 and a lower surface 22. Upper surface 20 has a plurality of convex protrusions 24. In the embodiment shown in FIG. 21, lower surface 22 has no protrusions or depressions. In the embodiment shown in FIG. 22, lower surface 22 has concave depressions 26 that correspond to convex protrusions 24. Upper surface 20 is positioned against a pipe 11 such that convex protrusions 24 make contact with pipe 11. By placing convex protrusions 24 against pipe 11, a unified and consistent air gap 28 is created between insulation material 14 and pipe 11. Air gap 28 helps to keep wet insulation material 14 off pipe 11, in the event of insulation material 14 wetting due to moisture ingress from surroundings. Referring to FIG. 3, to improve pipe and equipment protection, spacer wrap 12 fully encompasses pipe 11 and is installed prior to insulation material 14 which prevents direct contact between pipe 11 and insulation material 14. This helps to protect pipe 11 from moisture damage and corrosion under insulation, as well as damage from leaching agents and other contaminants contained in insulation material 14. Spacer wrap 12 may be held on pipe 11 using wire, banding, tape or any other suitable material for holding spacer wrap 12 on pipe 11. In the embodiment shown in FIG. 23, banding 13 is used. To ensure complete coverage of pipe 11, it is recommended that a minimum of a 2 inch overlap of the edges of spacer wrap 12 be used. Spacer wrap 12 is preferably made of polytetrafluoroethylene which is a flexible plastic.

Figure 21:
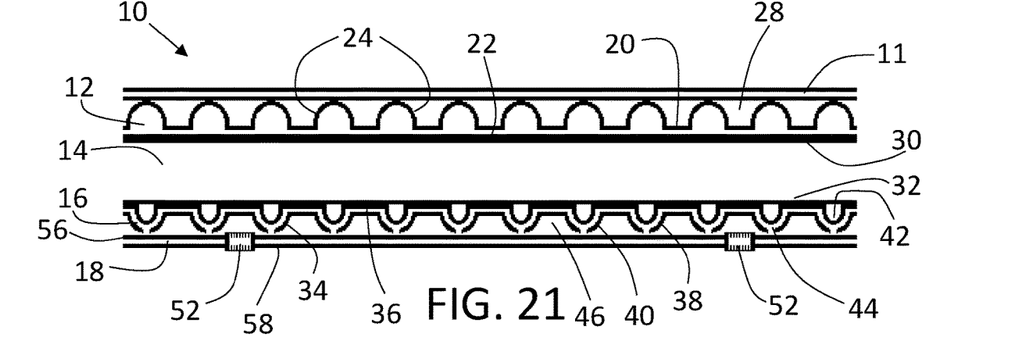
FIG. 21 is a simplified schematic view, in section, of the pipe insulation system.
Figure 22:
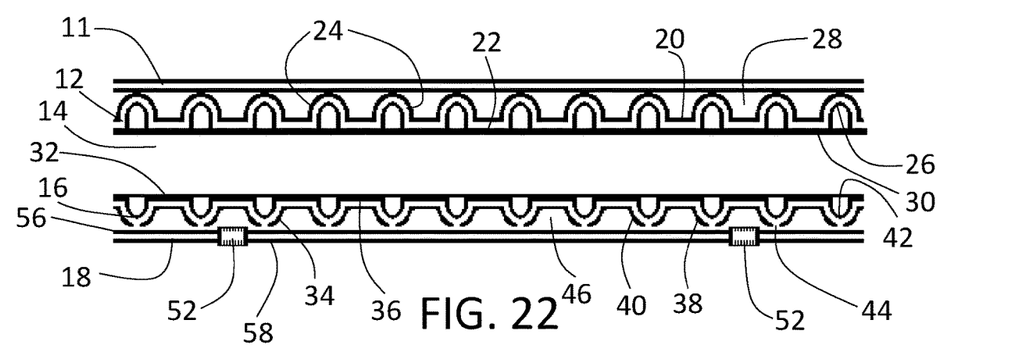
FIG. 22 is a simplified schematic view, in section, of the pipe insulation system.

Referring to FIG. 21 and FIG. 22, insulation material 14 has an inner surface 30 and an outer surface 32. In the embodiment shown, inner surface 30 of insulation material 14 contacts lower surface 22 of spacer wrap 12 when it is wrapped around pipe 11. It may be beneficial for insulation material 14 to be oversized to accommodate the presence of spacer wrap 12.

Figure 6:
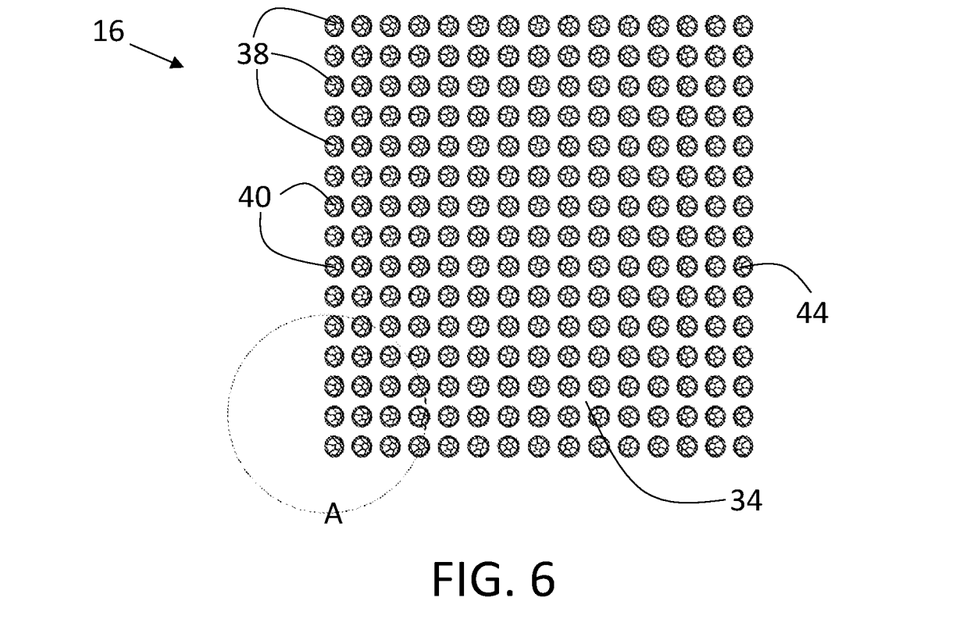
FIG. 6 is a top plan view of the perforated dimpled wrap.
Figure 7:
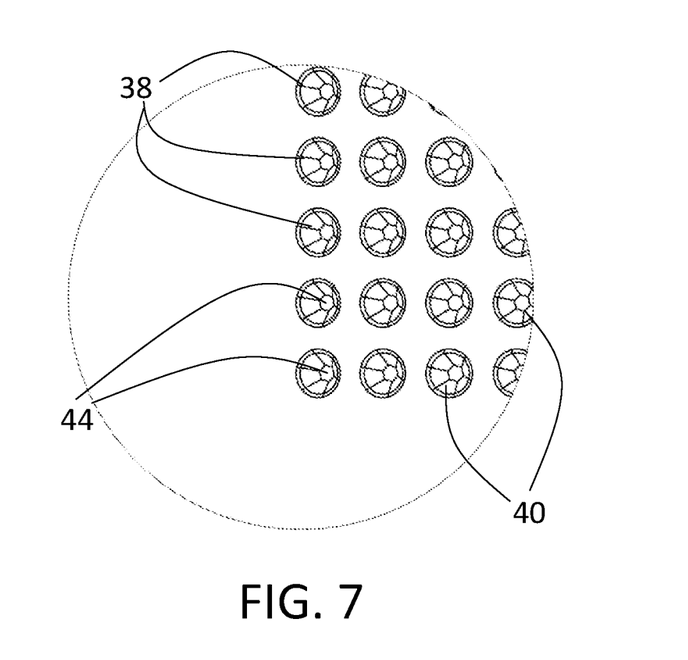
FIG. 7 is a detailed view of section "A" of FIG. 6.
Figure 8:
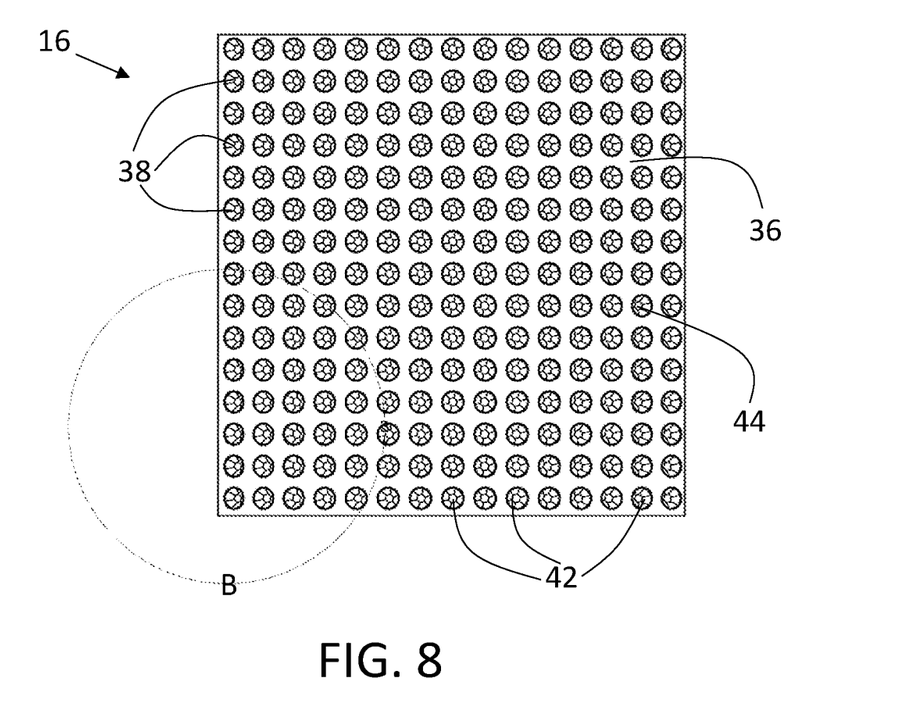
FIG. 8 is a bottom plan view of the perforated dimpled wrap
Figure 9:
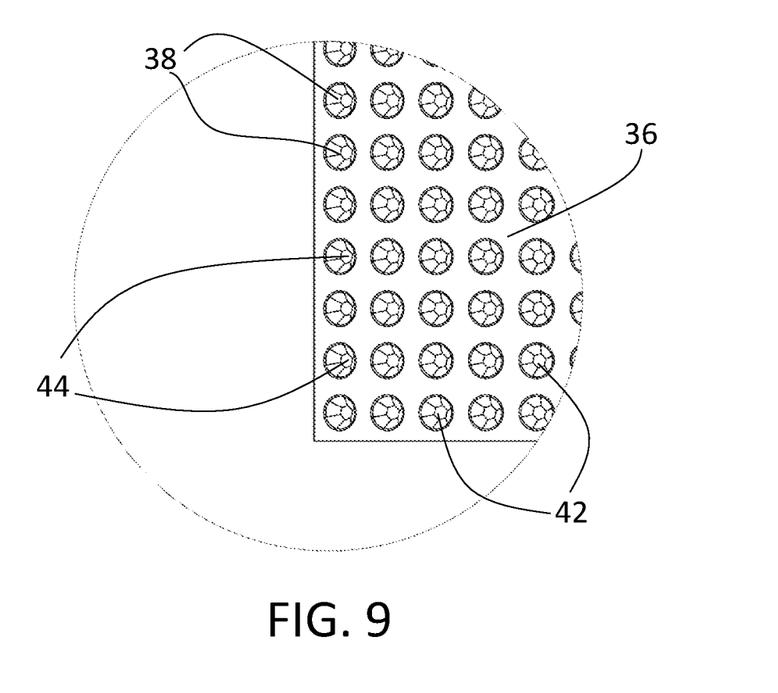
FIG. 9 is a detailed view of section "B" of FIG. 8.
Figure 10:
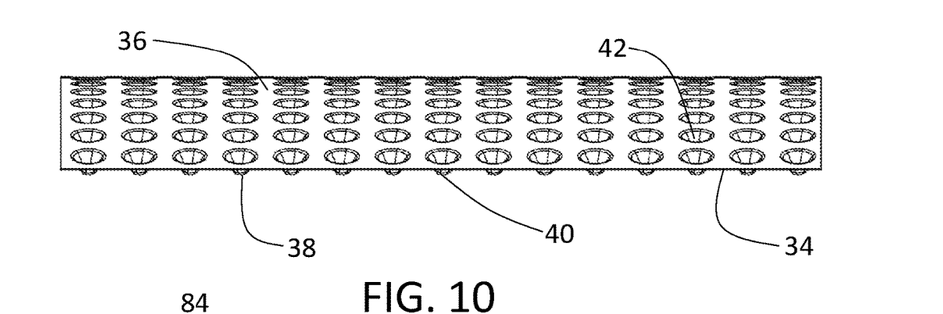
FIG. 10 is a perspective view of the perforated dimpled wrap and band.

Referring to FIG. 6 and FIG. 7, perforated dimple wrap 16 has an upper surface 34 and, referring to FIG. 8 and FIG. 9, a lower surface 36. Referring to FIG. 10, perforated dimple wrap 16 has a plurality of dimples 38 such that upper surface 34 has convex protrusions 40 and lower surface 36 has concave depressions 42 corresponding to convex protrusions 40. In the embodiment shown, each convex protrusion 42 has a perforation 44 through which moisture may drain. It will be understood by a person skilled in the art that only a portion of convex protrusions 40, or a single convex protrusion 40, require a perforation 44. It will be understood that better drainage may be seen where more convex protrusions 40 have perforations 44. Perforated dimple wrap 16 is positioned exterior to insulation material 14 and interior to cladding 16 such that upper surface 34 is adjacent cladding 16. Perforated dimple wrap 16 creates a consistent air gap 46 between insulation material 14 and cladding 16. Perforations 44 allow moisture trapped in insulation material 14 to pass through perforated dimple wrap 16 and drain out from drain 52 positioned in cladding 18. This may assist in mitigating corrosion under insulation and may prolong the service life of pipes 11. Perforated dimple wrap 16 may be held in position around outer surface 32 of insulation material 14 using wire, banding, tape or any other suitable material for holding perforated dimple wrap 16 around insulation material 14 and pipe 11.

Figure 12:
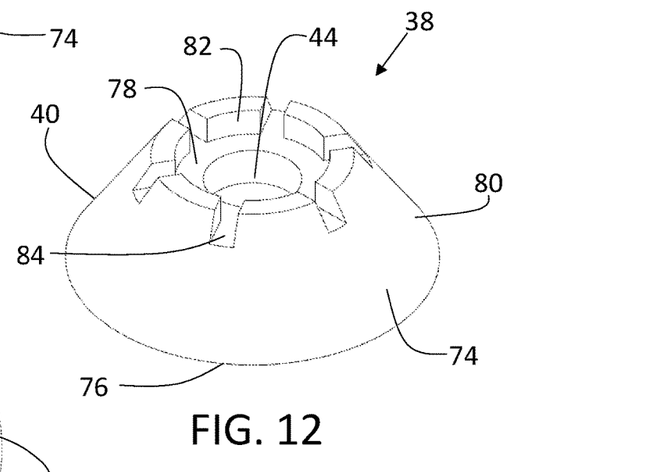
FIG. 12 is a perspective view of the dimple of the perforated dimple wrap shown in FIG. 11.
Figure 13:
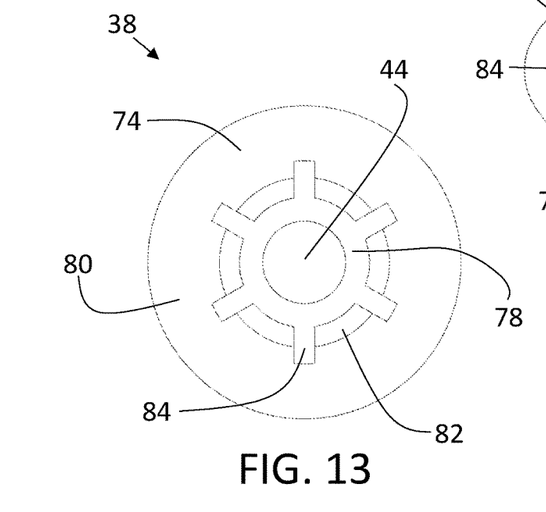
FIG. 13 is a top plan view of the dimple of the perforated dimple wrap shown in FIG. 11.
Figure 14:
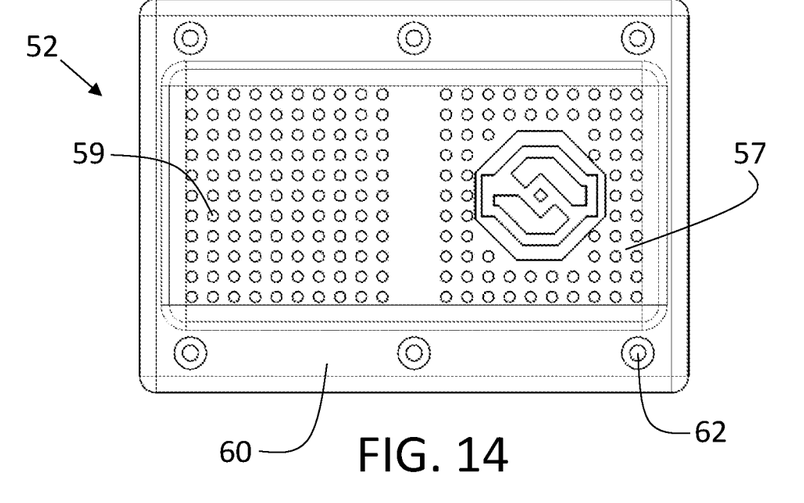
FIG. 14 is a front elevation view of a drain.
Figure 15:
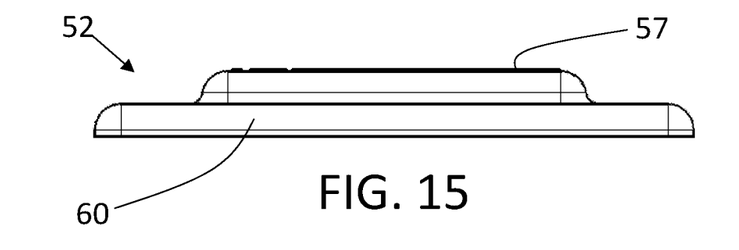
FIG. 15 is a top plan view of the drain shown in FIG. 14.
Figure 16:
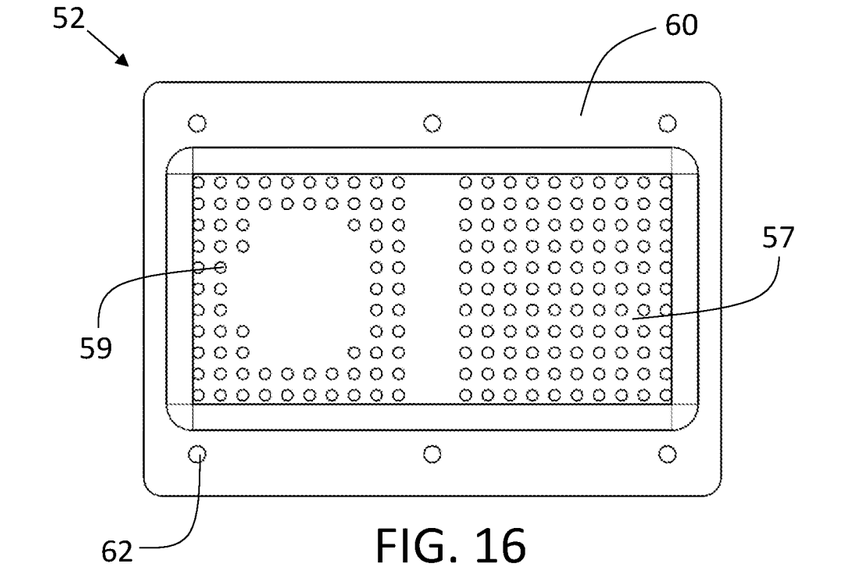
FIG. 16 is a rear elevation view of the drain shown in FIG. 14.
Figure 17:
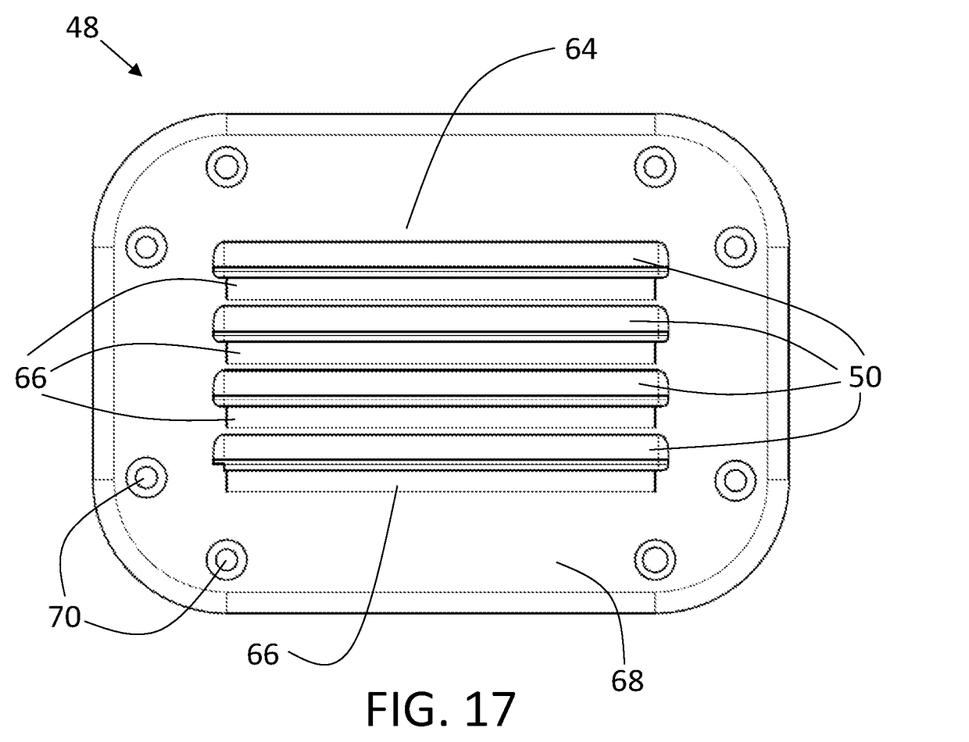
FIG. 17 is a front elevation view of a vent.
Figure 18:
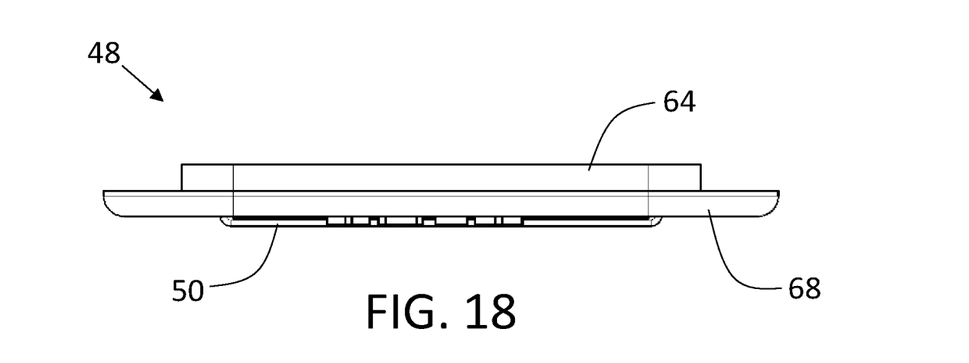
FIG. 18 is a top plan view of the vent shown in FIG. 17.
Figure 19:
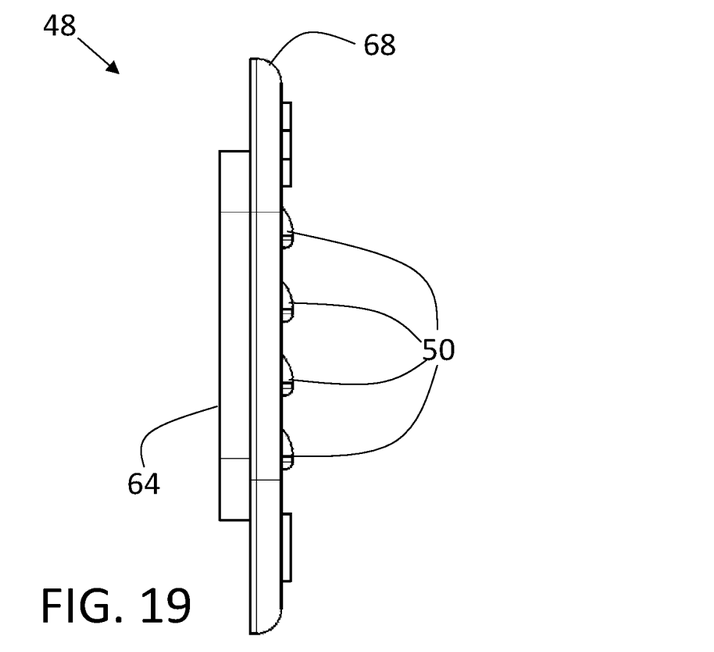
FIG. 19 is a side elevation view of the vent shown in FIG. 17.
Figure 20:
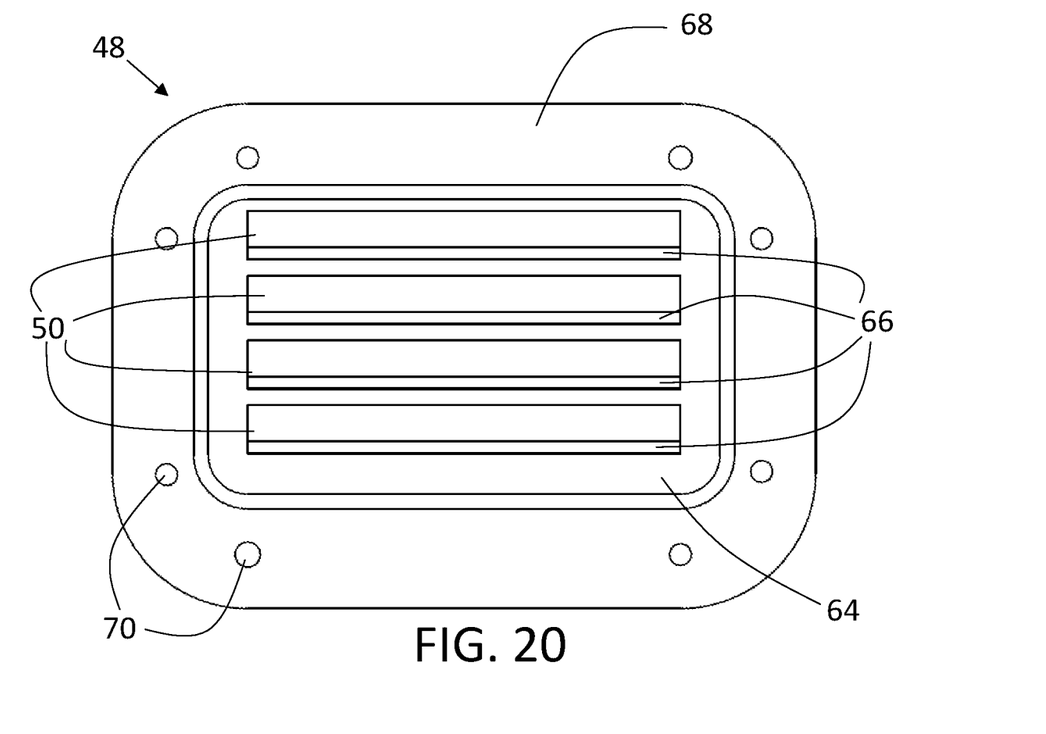
FIG. 20 is a rear elevation view of the vent shown in FIG. 17.

Referring to FIG. 12, dimples 38 have a hollow body 74 with a top 76, a bottom 78 and inward sloping peripheral sides 80 such that top 76 is larger than bottom 78. Top 76 is attached to upper surface 34 of perforated dimple wrap 16. Bottom 78 has perforation 44 through which moisture may drain. In the embodiment shown, dimples 38 are substantially conical in shape, however it will be understood by a person skilled in the art that different shapes may also be used. Inward sloping peripheral sides 80 assist with drainage through perforation 44. A wall 82 extends beyond bottom of hollow body 74. In the embodiment shown, wall 82 is sloped such that it corresponds to the slope of inward sloping peripheral sides 80 and wall 82 is continuous with inward sloping peripheral side 80. It will be understood by a person skilled in the art that wall 82 can have a different slope than inward sloping peripheral sides 80. Referring to FIG. 12-FIG. 14, slits 84 are provided at spaced intervals along wall to allow moisture to drain away from perforation 44 into air gap 46, shown in FIG. 21. It will be understood by a person skilled in the art that a single slit or multiple slits may be used. Multiple slits allow for drainage in multiple directions which can be beneficial. Slits 84 may be useful in promoting drainage and preventing moisture from accumulating within hollow body 74 in the event that bottom 78 or wall 82 seals itself to cladding 18.

Referring to FIG. 21, cladding 18 has an interior surface 56 and an exterior surface 58. Cladding 18 is positioned exterior to upper surface 34 of perforated dimple wrap. Cladding 18 may be made of metal or any other suitable material (such as non metals) and acts as a barrier to the ingress of water and other environmental contaminants around system 10.

Referring to FIG. 17-20, vents 48 provide ventilation to insulation system 10. In the embodiment shown, vents 48 have louvers 50 to reduce water ingress into system 10 while still promoting airflow. In the embodiment shown, vents 48 have a body 64 with four horizontal apertures 66. A person of skill will understand that apertures 66 may be different shaped and there may be more or fewer apertures 66. A portion of apertures 66 are covered by louvers 50. A connection flange 68 with fastening holes 70 extends from body 64 to allow vent 48 to be fastened to exterior 58 of cladding 18. Prior to vent 48 being fastened to cladding 18, a hole is created in cladding 18. Connection flange 68 contacts exterior surface 58 of cladding 18 and is screwed, bolted or otherwise affixed using fastening holes 70. In the embodiments shown in FIG. 1 and FIG. 2, vents 46 are installed at the 3 and 9 o'clock positions. The distance between vents 48 may vary. In one embodiment, spaces of approximately 3 meters may be used. Vents 48 make use of air gap 46, shown in FIG. 21 and FIG. 22, created by perforated dimple wrap 16.

Referring to FIG. 1, drains 52 may be provided on a lowest point 54 of cladding 18 to create drainage points for fluid within cladding 18 and insulation material 14. Drains 52 may also promote airflow along system 10. Being positioned on lowest point 54 of cladding 18 allows gravity to assist with drainage. Drains 52 make use of air gap 46 created by perforated dimple wrap 16. In the embodiment shown in FIG. 14 and FIG. 16, drain 52 has a central body 57 with a plurality of apertures 59. It will be understood by a person skilled in the art that a single aperture 58 would be sufficient to allow for the drainage of fluid and moisture from cladding 18. A connection flange 60 with fastening holes 62 extends from central body 56 to allow drain 52 to be fastened to exterior 58 of cladding 18. In the embodiment shown in FIG. 15, central body 57 is raised relative to connection flange 60. Prior to drain 52 being fastened to cladding 18, a hole is created in cladding 18. Connection flange 60 contacts exterior surface 58 of cladding 18 and is screwed, bolted or otherwise affixed using fastening holes 62.

Figure 4:
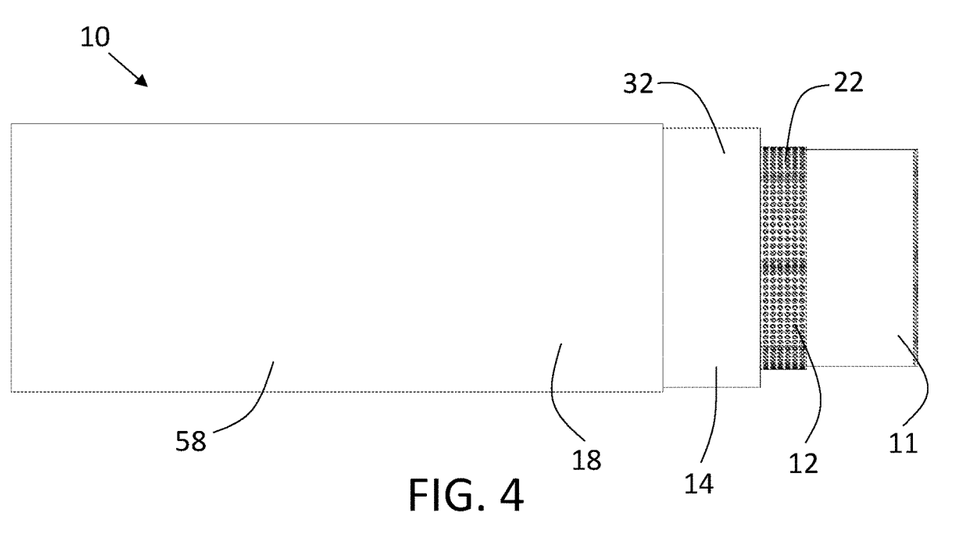
FIG. 4 is a side elevation view of a variation of the pipe insulation system with a spacer wrap.

Spacer Wrap:

Referring to FIG. 4, in the embodiment shown, pipe insulation system 10 has a spacer wrap 12, an insulation material 14 and a cladding 18. Referring to FIG. 21 and FIG. 22, spacer wrap 12 has an upper surface 20 and a lower surface 22. Upper surface 20 has a plurality of convex protrusions 24. In the embodiment shown in FIG. 21, lower surface 22 has no protrusions or depressions. In the embodiment shown in FIG. 22, lower surface 22 may have concave depressions 26 that correspond to convex protrusions 24. Upper surface 20 is positioned against a pipe 11 such that convex protrusions 24 make contact with pipe 11. By placing convex protrusions 24 against pipe 11, a unified and consistent air gap 28 is created between insulation material 14 and pipe 11. Air gap 28 helps to keep wet insulation material 14 off pipe 11, in the event of insulation material 14 wetting due to moisture ingress from surroundings. To improve pipe and equipment protection, spacer wrap 12 fully encompasses pipe 11 and is installed prior to insulation material 14 which prevents direct contact between pipe 11 and insulation material 14. This helps to protect pipe 11 from moisture damage and corrosion under insulation, as well as damage from leaching agents and other contaminants contained in insulation material 14. Spacer wrap 12 may be held on pipe 11 using wire, banding, tape or any other suitable material for holding spacer wrap 12 on pipe 11. In the embodiment shown in FIG. 23, banding 13 is used. To ensure complete coverage of pipe 11, it is recommended that a minimum of a 2 inch overlap of the edges of spacer wrap 12 be used. Spacer wrap is preferably made of polytetrafluoroethylene.

Referring to FIG. 22, insulation material 14 has an inner surface 30 and an outer surface 32. In the embodiment shown, inner surface 30 of insulation material 14 contacts lower surface 22 of spacer wrap 12 when it is wrapped around pipe 11. It may be beneficial for insulation material 14 to be oversized to accommodate the presence of spacer wrap 12.

Cladding 18 has an interior surface 56 and an exterior surface 58. Cladding 18 is positioned exterior to upper surface 34 of perforated dimple wrap. Cladding 18 may be made of metal or any other suitable material (such as non metals) and acts as a barrier to the ingress of water and other environmental contaminants around system 10.

Figure 5:
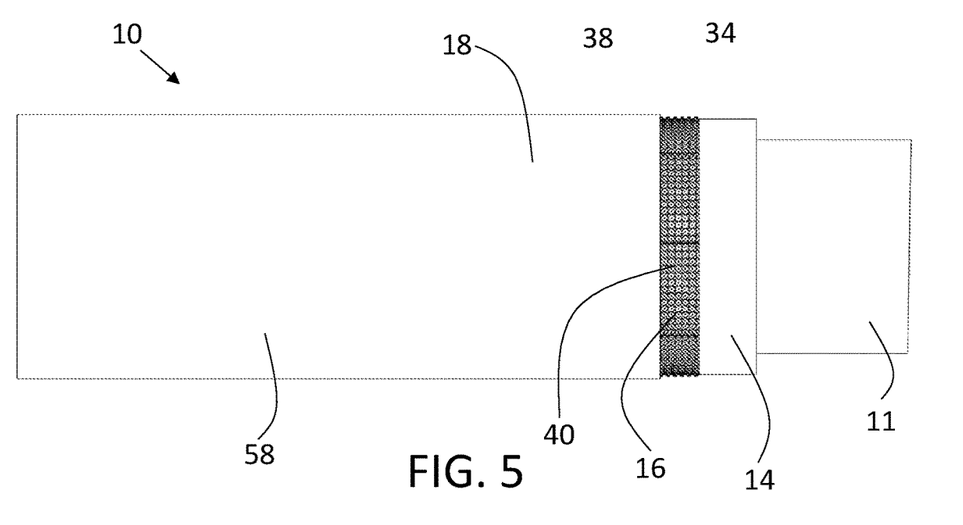
FIG. 5 is a side elevation view of a variation of the pipe insulation system with a perforated dimple wrap.

Perforated Dimple Wrap:

Referring to FIG. 5, in the embodiment shown, pipe insulation system 10 has insulation material 14, a perforated dimple wrap 16 and cladding 18. Referring to FIG. 21 and FIG. 22, insulation material 14 has an inner surface 30 and an outer surface 32. In the embodiment shown, inner surface 30 of insulation material 14 contacts pipe 11. Referring to FIG. 6 and FIG. 7, perforated dimple wrap 16 has an upper surface 34 and, referring to FIG. 8 and FIG. 9, a lower surface 36. Referring to FIG. 10, perforated dimple wrap 16 has a plurality of dimples 38 such that upper surface 34 has convex protrusions 40 and lower surface 36 has concave depressions 42 corresponding to convex protrusions 40. In the embodiment shown, each convex protrusion 42 has a perforation 44 through which moisture may drain. It will be understood by a person skilled in the art that only a portion of convex protrusions 40, or a single convex protrusion 40, require a perforation 44. It will be understood that better drainage may occur where more convex protrusions 40 have perforations 44. Perforated dimple wrap 16 is positioned exterior to insulation material 14 and interior to cladding 16 such that upper surface 34 is adjacent cladding 18. Perforated dimple wrap 16 creates a consistent air gap 46 between insulation material 14 and cladding 18. Perforations 44 allow moisture trapped in insulation material 14 to pass through perforated dimple wrap 16 and drain out from drain 52. This may assist in mitigating corrosion under insulation and may prolong the service life of pipes 11. Perforated dimple wrap 16 may be held in position around outer surface 32 of insulation material 14 using wire, banding, tape or any other suitable material for holding perforated dimple wrap 16 around insulation material 14 and pipe 11.

Figure 11:
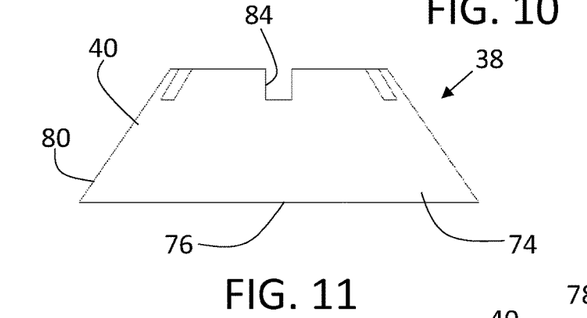
FIG. 11 is a side elevation view of a dimple of the perforated dimple wrap.

Referring to FIG. 12, dimples 38 have a hollow body 74 with a top 76, a bottom 78 and inward sloping peripheral sides 80 such that top 76 is larger than bottom 78. Top 76 is attached to upper surface 34 of perforated dimple wrap 16. Bottom 78 has perforation 44 through which moisture may drain. In the embodiment shown, dimples 38 are substantially conical in shape, however it will be understood by a person skilled in the art that different shapes may also be used. Inward sloping peripheral sides 80 assist with drainage through perforation 44. A wall 82 extends beyond bottom of hollow body 74. In the embodiment shown, wall 82 is sloped such that it corresponds to the slope of inward sloping peripheral sides 80 and wall 82 is continuous with inward sloping peripheral side 80. It will be understood by a person skilled in the art that wall 82 can have a different slope than inward sloping peripheral sides 80. Referring to FIG. 11-FIG. 13, slits 84 are provided at spaced intervals along wall to allow moisture to drain away from perforation 44 into air gap 46, shown in FIG. 21. It will be understood by a person skilled in the art that a single slit or multiple slits may be used. Multiple slits allow for drainage in multiple directions which can be beneficial. Slits 84 may be useful in promoting drainage and preventing moisture from accumulating within hollow body 74 in the event that bottom 78 or wall 82 seals itself to cladding 18.

Referring to FIG. 21, cladding 18 has an interior surface 56 and an exterior surface 58. Cladding 18 is positioned exterior to upper surface 34 of perforated dimple wrap. Cladding 18 may be made of metal or any other suitable material (such as non metals) and acts as a barrier to the ingress of water and other environmental contaminants around system 10.

Referring to FIG. 17-20, vents 48 provide ventilation to insulation system 10. In the embodiment shown, vents 48 have louvers 50 to reduce water ingress into system 10 while promoting airflow. In the embodiment shown, vents 48 have a body 64 with four horizontal apertures 66. A person of skill will understand that apertures 66 may be different shaped and there may be more or fewer apertures 66. A portion of apertures 66 are covered by louvers 50. A connection flange 68 with fastening holes 70 extends from body 64 to allow vent 48 to be fastened to exterior 58 of cladding 18. Prior to vent 48 being fastened to cladding 18, a hole is created in cladding 18. Connection flange 68 contacts exterior surface 58 of cladding 18 and is screwed, bolted or otherwise affixed using fastening holes 70. In the embodiments shown in FIG. 1 and FIG. 2, vents 46 are installed at the 3 and 9 o'clock positions. The distance between vents 48 may vary. In one embodiment, spaces of approximately 3 meters may be used. Vents 46 make use of air gap 46, shown in FIG. 21 and FIG. 22, created by perforated dimple wrap 16.

Referring to FIG. 1, drains 52 may be provided on a lowest point 54 of cladding 18 to create drainage points for fluid within cladding 18 and insulation material 14. Drains 52 may also promote airflow along system 10. Being positioned on the bottom 54 of cladding 18 allows gravity to assist with drainage. Drains 52 make use of air gap 46 created by perforated dimple wrap 16. In the embodiment shown in FIG. 14 and FIG. 16, drain 52 has a central body 57 with a plurality of apertures 59. It will be understood by a person skilled in the art that a single aperture 58 would be sufficient to allow for the drainage of fluid and moisture from cladding 18. A connection flange 60 with fastening holes 62 extends from central body 56 to allow drain 52 to be fastened to exterior 58 of cladding 18. In the embodiment shown in FIG. 15, central body 57 is raised relative to connection flange 60. Prior to drain 52 being fastened to cladding 18, a hole is created in cladding 18. Connection flange 60 contacts exterior surface 58 of cladding 18 and is screwed, bolted or otherwise affixed using fastening holes 62.

Installation:

Pipes at different temperatures, pressures and carrying different products may benefit from different types of insulation systems. As an example, steel pipes with operating temperatures in the range of −128.9° C. to 260° C. (−200° F. to −500° F.) can benefit from insulation system 10. System 10 may retard the undesirable moisture activities underneath insulation and claddings (eg. accumulation, stagnation, resident time, etc.) as well as subsequent corrosion, in the event of rain, snow, harsh marine or offshore conditions. With insulated stainless steel in marine applications, there is a high chance of chloride stress corrosion cracking. The use of insulation system 10 may significantly reduce the probability of chloride stress corrosion cracking by providing an impermeable barrier to chlorides (leaching or intruding) against stainless steel pipes.

Figure 2:
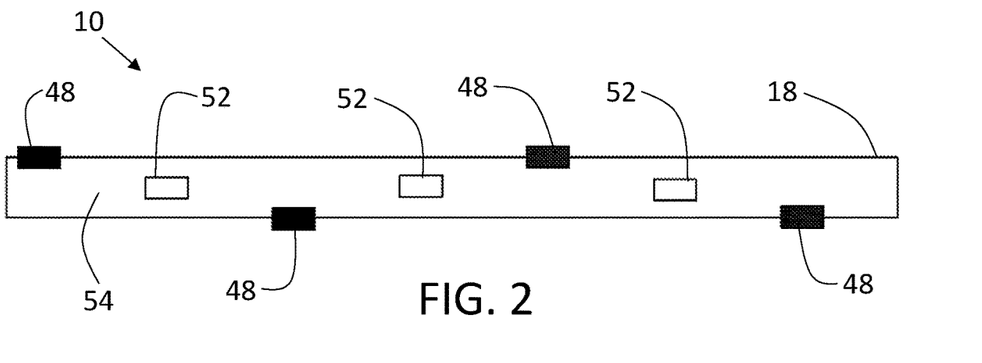
FIG. 2 is a bottom schematic view of the pipe insulation system.
Figure 23:
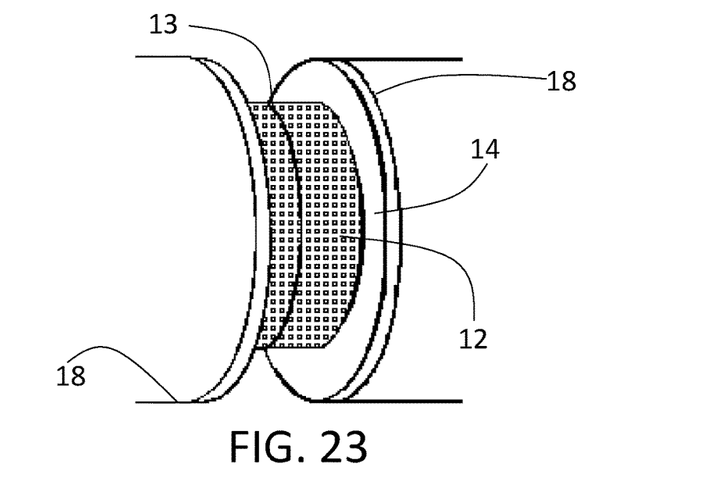
FIG. 23 is a perspective view, partially in section, of the pipe insulation system.

In the embodiment shown in FIG. 4, spacer wrap 12 and insulation material 14 are installed between pipe 11 and cladding 18. Spacer wrap 12 is wrapped around pipe 11. Referring to FIG. 21 and FIG. 22, spacer wrap 12 is wrapped around pipe 11 such that convex protrusions contact pipe 11. To ensure complete coverage of pipe 11, it is recommended that a minimum of a 2 inch overlap of the edges of spacer wrap 12 be used. Referring to FIG. 23, spacer wrap 12 is secured around pipe 11 using banding 13. Insulation material 14 is wrapped around pipe 11 and spacer wrap 12 such that insulation material 14 contacts spacer wrap 12. It may be beneficial for insulation material 14 to be oversized to accommodate the presence of spacer wrap 12. Insulation material 14 may be secured using wire, banding or any other appropriate material. Insulation material 14 may also be secured by cladding 18. Cladding 18 is placed over insulation material 14 such that it encompasses pipe 11, spacer wrap 12 and insulation material 14. Referring to FIG. 2, vents 48 and drains 52 may also be installed to encourage airflow within cladding 18 and allow for drainage from cladding 18.

In the embodiment shown in FIG. 5, insulation material 14 and perforated dimple wrap 16 are installed between pipe 11 and cladding 18. Insulation material 14 is wrapped around pipe 11. Insulation material 14 may be secured using wire, banding or any other appropriate material. Insulation material 14 may also be secured by perforated dimple wrap 16 which is wrapped around insulation material 14. Referring to FIG. 21 and FIG. 22, perforated dimple wrap 16 is wrapped around insulation material 14 such that lower surface 36 contacts insulation material 14. Cladding 18 is placed over perforated dimple wrap 16 such that it contacts convex protrusions 40 of upper surface 34 and encompasses pipe 11, insulation material 14 and perforated dimple wrap 16. Referring to FIG. 2, vents 48 and drains 52 may also be installed to encourage airflow within cladding 18 and allow for drainage from cladding 18.

In the embodiment shown in FIG. 1, spacer wrap 12, insulation material 14 and perforated dimple wrap 16 are installed between pipe 11 and cladding 18. Spacer wrap 12 is wrapped around pipe 11. Referring to FIG. 21 and FIG. 22, spacer wrap 12 is wrapped around pipe 11 such that convex protrusions contact pipe 11. To ensure complete coverage of pipe 11, it is recommended that a minimum of a 2 inch overlap of the edges of spacer wrap 12 be used. Referring to FIG. 23, spacer wrap 12 is secured around pipe 11 using banding 13. Insulation material 14 is wrapped around pipe 11 and spacer wrap 12 such that insulation material 14 contacts spacer wrap 12. It may be beneficial for insulation material 14 to be oversized to accommodate the presence of spacer wrap 12. Insulation material 14 may be secured using wire, banding or any other appropriate material. Insulation material 14 may also be secured by perforated dimple wrap 16 which is wrapped around insulation material 14. Referring to FIG. 21 and FIG. 22, perforated dimple wrap 16 is wrapped around insulation material 14 such that lower surface 36 contacts insulation material 14. Cladding 18 is placed over perforated dimple wrap 16 such that it contacts convex protrusions 40 of upper surface 34 and encompasses pipe 11, spacer wrap 12, insulation material 14 and perforated dimple wrap 16. Referring to FIG. 2, vents 48 and drains 52 may also be installed to encourage airflow within cladding 18 and allow for drainage from cladding 18 and insulation material 14.

Any use herein of any terms describing an interaction between elements is not meant to limit the interaction to direct interaction between the subject elements, and may also include indirect interaction between the elements such as through secondary or intermediary structure unless specifically stated otherwise.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent that changes may be made to the illustrative embodiments, while falling within the scope of the invention. As such, the scope of the following claims should not be limited by the preferred embodiments set forth in the examples and drawings described above, but should be given the broadest interpretation consistent with the description as a whole.

What is claimed is:

1. A pipe insulation system comprising:
   a spacer wrap having an upper surface and a lower surface, the spacer wrap being a non-metallic flexible sheet, the upper surface of the spacer wrap having a plurality of convex protrusions such that the multiple convex protrusions are positioned along a length and a width of the spacer wrap, the upper surface being positioned against a pipe, the spacer wrap being wrappable around the pipe such that it acts as a barrier to the pipe;
   an insulation material having an inner surface and an outer surface, the insulation material being positioned exterior to the lower surface of the spacer wrap;
   a cladding having an interior surface and an exterior surface, the cladding being positioned exterior to the outer surface of the insulation material.

2. The pipe insulation system of claim 1 wherein the spacer wrap is made of polytetrafluoroethylene.

3. The pipe insulation system of claim 1 wherein the spacer wrap is held in place around the pipe with banding.

4. The pipe insulation system of claim 1 wherein the lower surface of the spacer wrap has concave depressions corresponding to the convex protrusions.

5. The pipe insulation system of claim 1 further comprising a perforated dimple wrap having an upper surface and a lower surface, the perforated dimple wrap having a plurality of dimples such that the upper surface has convex protrusions and the lower surface having concave depressions corresponding to the convex protrusions, at least a portion of the convex protrusions having a perforation through which moisture may drain, the perforated dimple wrap being positioned exterior to the insulation material and interior to the cladding.

6. The pipe insulation system of claim 5 wherein the plurality of dimples comprise a hollow body having a top, a bottom and at least one inward sloping peripheral side, the top of hollow body being attached to the upper surface of the perforated dimple wrap, the bottom having the perforation.

7. The pipe insulation system of claim 6 wherein the plurality of dimples further comprises a wall extending beyond the bottom of the hollow body, the wall having at least one slit through which moisture may drain.

8. A pipe insulation system comprising:
   an insulation material having an inner surface and an outer surface;
   a perforated dimple wrap having an upper surface and a lower surface, the perforated dimple wrap having a plurality of dimples such that the upper surface having convex protrusions and the lower surface having concave depressions corresponding to the convex protrusions, at least a portion of the convex protrusions having a perforation through which moisture may drain, the perforated dimple wrap being positioned around the outer surface of the insulation material;
   a cladding having an interior surface and an exterior surface, the cladding being positioned adjacent the upper surface of the perforated dimple wrap.

9. The pipe insulation system of claim 8 wherein the plurality of dimples comprise a hollow body having a top, a bottom and at least one inward sloping peripheral side, the top of hollow body being attached to the upper surface of the perforated dimple wrap, the bottom having the perforation.

10. The pipe insulation system of claim 9 wherein the plurality of dimples further comprises a wall extending beyond the bottom of the hollow body, the wall having at least one slit through which moisture may drain.

11. The pipe insulation system of claim 8 wherein at least one vent is positioned in the cladding such that air may pass through the vent to create airflow within the cladding.

12. The pipe insulation system of claim 11 wherein the at least one vent has louvers to reduce water ingress.

13. The pipe insulation system of claim 8 wherein at least one drain is positioned on a lowest point of the cladding to create at least one drainage point for fluid within the cladding and insulation material.

14. The pipe insulation system of claim 8 further comprising a spacer wrap having an upper surface and a lower surface, the upper surface of the spacer wrap having a plurality of convex protrusions, the lower surface being positioned against the inner surface of the insulation material.

15. The pipe insulation system of claim 12 wherein the lower surface of the spacer wrap has concave depressions corresponding to the convex protrusions.

16. A method of insulating a piping system comprising:
   providing insulation material having a top surface and a bottom surface, the bottom surface being positioned adjacent a pipe;
   providing cladding having an interior surface and an exterior surface, the cladding being positioned exterior to the outer surface of the insulation material;
   providing at least one drain positioned on a bottom of the cladding to create at least one drainage point for fluid within the cladding; and
   a spacer wrap having an upper surface and a lower surface, the upper surface of the spacer wrap having a plurality of convex protrusions, the lower surface being positioned interior to the insulation material.

17. The method of claim 16 wherein the lower surface of the spacer wrap has concave depressions corresponding to the convex protrusions.

18. The method of claim 16 further comprising providing a perforated dimple wrap having an upper surface and a lower surface, the perforated dimple wrap having a plurality of dimples such that the upper surface has convex protrusions and the lower surface has concave depressions corresponding to the convex protrusions, at least a portion of the convex protrusions having a perforation through which moisture may drain, the perforated dimple wrap being positioned around the outer surface of the insulation material and interior to the cladding.

19. The pipe insulation system of claim 16 wherein at least one vent is positioned on the cladding such that air may pass through the vent to create airflow within the cladding.

20. The pipe insulation system of claim 19 wherein the at least one vent has louvers to reduce water ingress.

21. A method of insulating a piping system comprising:
providing insulation material having a top surface and a bottom surface, the bottom surface being positioned adjacent a pipe;
providing cladding having an interior surface and an exterior surface, the cladding being positioned exterior to the outer surface of the insulation material;
providing at least one drain positioned on a bottom of the cladding to create at least one drainage point for fluid within the cladding; and
a perforated dimple wrap having an upper surface and a lower surface, the perforated dimple wrap having a plurality of dimples such that the upper surface has convex protrusions and the lower surface has concave depressions corresponding to the convex protrusions, at least a portion of the convex protrusions having a perforation through which moisture may drain, the perforated dimple wrap being positioned around the outer surface of the insulation material and interior to the cladding.

22. The method of claim 21 further comprising providing a spacer wrap having an upper surface and a lower surface, the upper surface of the spacer wrap having a plurality of convex protrusions, the lower surface being positioned interior to the insulation material.

23. The method of claim 22 wherein the lower surface of the spacer wrap has concave depressions corresponding to the convex protrusions.

24. The pipe insulation system of claim 21 wherein at least one vent is positioned on the cladding such that air may pass through the vent to create airflow within the cladding.

25. The pipe insulation system of claim 24 wherein the at least one vent has louvers to reduce water ingress.

* * * * *